Patented May 1, 1945

2,374,741

UNITED STATES PATENT OFFICE 2,374,741

PIGMENT PREPARATION

Frederick W. Gage, Akron, and Paul J. Gegner, Barberton, Ohio, assignors to Pittsburgh Plate Glass Company, Pittsburgh, Pa., a corporation of Pennsylvania No Drawing. Application March 20, 1943, Serial No. 479,914

6 Claims. (Cl. 106—306)

This invention relates to a method of preparing finely divided pigments in a form which will not agglomerate during the washing and drying operations. The new method is applicable in the preparation of any pigment or other solid material which is precipitated from water solution. The method is particularly applicable for the preparation of alkaline earth metal carbonates such as calcium carbonate and magnesium carbonate but may also be used to prepare lithopone, titanium dioxide, zinc sulfide, calcium silicate, barium sulphate, calcium oxalate and zinc oxide.

These pigments are frequently prepared by precipitation from water solutions and separated from soluble impurities by filtering and washing. During the washing and subsequent drying operations the pigmentary particles frequently agglomerate or cake to such an extent that they must be subjected to a pulverizing treatment before use and sometimes cannot be reduced to a desirable state of subdivision. This is especially true when the pigments are to be incorporated in natural or synthetic rubber compositions. It has been the custom in the industry to add agents which prevent agglomeration or assist in the subdivision of the agglomerated forms. For this purpose tall oil, coconut oil and other similar agents have been used.

This invention is particularly related to the utilization of tall oil in calcium carbonate preparation. It has been found that tall oil gives irregular results unless certain precautions are taken. In Frederick W. Gage's Patent No. 2,345,191 there is described a method of incorporating tall oil at an elevated temperature by mixing 0.5 to 5.0 percent by weight, tall oil (based on the dry pigment) into a slurry of calcium carbonate or other pigment at temperatures in excess of 50° C. Pigments having an average particle size of as low as 0.5 microns may be obtained thereby in unagglomerated state.

We have now discovered that a careful control of the alkalinity will give better and more uniform results which can be reproduced consistently. It has been the practice in the preparation of calcium carbonate to wash the pigment free of alkali before adding the tall oil. Occasionally, this procedure results in poor dispersion of the oil in which case the agglomeration is not entirely prevented. Local concentrations of tall oil may cause a balling effect or greatly increased agglomeration. These difficulties may be avoided by maintaining a small concentration of sodium hydroxide in the slurry at the time the tall oil is added.

The beneficial effect may be secured by the presence of one-half or more percent by weight NaOH in the slurry (based on dry $CaCO_3$). The caustic may be added to the washed calcium carbonate or it may be present as a residue from the reaction which produces the calcium carbonate such as:

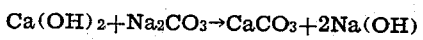

$$Ca(OH)_2 + Na_2CO_3 \rightarrow CaCO_3 + 2Na(OH)$$

After adding the tall oil, the slurry is filtered and then dried preferably at a temperature less than 120° C. to produce a finely divided pulverulent calcium carbonate free of agglomerated particles and possessing a uniformly distributed coating of tall oil.

The following examples are illustrative of the invention:

Example I

A soda ash liquor containing 100 gms. per liter of $Na_2CO_3$ was rapidly mixed with a blow-off liquor from the ammonia soda process. The latter contained 125 gms. per liter of $CaCl_2$ and quantities of NaCl. The finely divided precipitate was filtered again and washed on the filter. It was reslurried again with water, heated to 65° C. and mixed with 2% NaOH by weight and then mixed with 1% by weight of tall oil. The product was filtered and dried at 90 to 100° C. A uniformly coated and non-agglomerated calcium carbonate was formed.

Example II

A milk of lime slurry was carbonated by passing a stream of carbon dioxide therethrough until precipitation was complete. The temperature was maintained below 35° C. during the reaction. After washing the precipitate with water it was mixed with 1% by weight NaOH, suspended in water and heated to 80° C. Tall oil (2½% on the dry $CaCO_3$ basis) was mixed in thoroughly. After filtering and drying an excellent pigmentary calcium carbonate was obtained.

Example III

A calcium chloride liquor containing 130 gms. $CaCl_2$ per liter was added slowly with constant stirring to a solution containing 105 gms. of $Na_2CO_3$ per liter. After stoichiometric quantities of $CaCl_2$ and $NaCO_3$ had been reacted, the mixture was heated, 4% of a mixture of equal parts of caustic soda and tall oil was added, and the stirring continued until a homogeneous mixture was obtained. Washing and drying at 120° C. produced a good grade finely divided pigment.

Example IV

Approximately 10 liters of a good grade milk of lime containing 75 gms. of CaO per liter was thoroughly mixed with 2000 gms. (35% excess) of soda ash at 25° C. The precipitated calcium carbonate was washed until the wash water had a pH of between 9 and 11. Two percent of tall oil was added at 75° C. and thoroughly dispersed. After filtering the pigment was dried and found to be an excellent non-agglomerated finely divided material.

Although the invention has been described with respect to certain specific examples, it is not intended that the details of the same shall be limitations on the scope of the invention except to the extent incorporated in the following claims.

We claim:

1. A method of preparing a finely divided pigment free of agglomerated particles which comprises precipitating the pigment from water solution, mixing a water slurry of said pigment with sufficient tall oil to coat the particles at a temperature in excess of 50° C. and in the presence of 0.5 to 2.0 percent by weight of alkali metal hydroxide based on dry pigment separating the pigment and drying at a temperature below 120° C.

2. A method of preparing a finely divided alkaline earth metal carbonate pigment which comprises mixing the finely divided precipitated pigment with sufficient tall oil to coat the pigment particles in the presence of 0.5 to 2.0 percent by weight of alkali metal hydroxide based on dry pigment, separating the coated pigment and drying at a temperature not in excess of 120° C.

3. A method of preparing a finely divided alkaline earth metal carbonate pigment which comprises suspending a finely divided precipitated alkaline earth metal carbonate in water containing alkali metal hydroxide in amount within the range 0.5 to 2 percent by weight of the alkaline earth metal carbonate on the dry basis mixing therein 0.5 to 5.0 percent by weight of tall oil based on dry pigment, separating the coated pigment and drying.

4. A method of preparing a finely divided pigment which comprises suspending finely divided precipitated calcium carbonate in an aqueous slurry with 0.5 to 2.0 percent by weight of alkali metal hydroxide based on dry calcium carbonate mixing therewith at a temperature in excess of 50° C. sufficient tall oil to coat the pigment, separating the coated pigment and drying at a temperature below 120° C.

5. The method of preparing a finely divided pigment which consists in suspending finely divided precipitated calcium carbonate in an aqueous slurry with 0.5 to 2.0 percent by weight sodium hydroxide based on solid calcium carbonate mixing therewith between 0.5 and 5.0 percent by weight tall oil based on dry carbonate at a temperature of at least 60° C., separating the oil coated pigment, and drying at a temperature between 100° C. and 120° C.

6. A method of preparing a finely divided pigment free of agglomerated particles which comprise precipitating the pigment from water solution, mixing a water slurry of said pigment with sufficient tall oil to coat the particles at a temperature in excess of 50 C. and in the presence of from 0.5 to 2.0 percent by weight of alkali metal hydroxide based on dry pigment, separating the coated pigment and drying.

FREDERICK W. GAGE.
PAUL J. GEGNER.